May 9, 1944.   L. BIRKIGT   2,348,518
POWER PLANT
Filed March 11, 1941
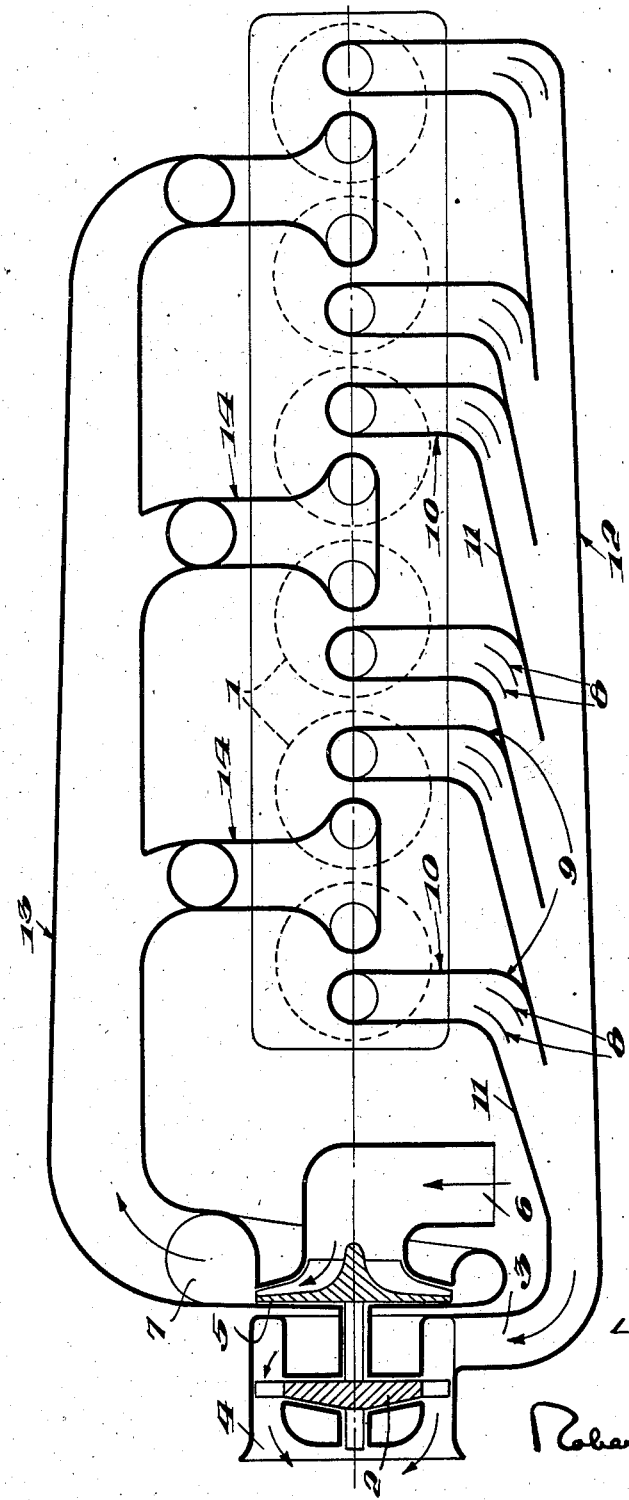
Inventor
LOUIS BIRKIGT,
Robert B Pearson
Attorney Patented May 9, 1944

2,348,518

UNITED STATES PATENT OFFICE 2,348,518

POWER PLANT

Louis Birkigt, Rive Bleue, Versoix, near Geneva, Switzerland

Application March 11, 1941, Serial No. 382,765
In France February 23, 1940

3 Claims. (Cl. 60—13)

The present invention relates to power plants of the type including an internal combustion engine and at least one turbine fed, as motive fluid, by the exhaust gases from said engine, and more particularly to power plants in which said turbine is associated with a compressor for feeding the air to the engine intake. The invention is more especially, although not exclusively, concerned with power plants of this kind, for use on aircraft.

The chief object of the present invention is to provide a power plant of this type, which is better adapted than those used up to the present time, to meet any requirements of practice.

An important feature of the invention consists in providing, between the exhaust of the engine and the turbine, means for ensuring a smooth flow without eddies, of the streams of exhaust gases on their way toward said turbine, such means consisting for instance in guiding elements arranged in combination with the exhaust conduits.

Other features of the present invention will result from the following detailed description of some specific embodiments thereof.

Preferred embodiments of the present invention will be hereinafter described, with reference to the accompanying drawing, given merely by way of example and in which the only figure is a diagrammatical view of a power plant including a six cylinder engine and a turbo-compressor associated therewith according to the present invention.

In the following description, it will be exposed that the invention is applied to the construction of a power plant for use on an airplane or other aircraft.

The power plant shown by the drawing includes a group of six cylinders 1 and a turbo-compressor including two elements:

(a) A turbine 2 having its gas intake at 3 and its outlet at 4;

(b) A compressor shown at 5, with its air inlet at 6 and its outlet leading to the engine at 7.

The carburation may be effected either before or after the compressor.

Concerning now the means for causing the exhaust gases from the engine to be fed to the turbine, they are adapted to ensure a smooth flow without eddies of the streams of said gases.

According to an embodiment of the invention, these means will be provided with elements capable of guiding these fluid streams along the whole of their path between the engine and the turbine.

In the embodiment of the drawing, given by way of example, these guiding elements are constituted by stationary vanes or blades 8 (which may be made adjustable), provided in the bends 9 of the exhaust pipes leading out from the engine cylinders.

These vanes or blades, which can easily be designed by anyone skilled in the art, are made for instance, of the desired shape, either with thin metal sheets or with parts having a substantial thickness, chosen in such manner as to ensure the desired result.

In the drawing, it has been supposed that bends 9 are made in the usual manner, that is to say of curved connection extending between two tubular parts 10 and 11, for instance of rectilinear shape. Vanes 8 then serve to avoid the eddies which otherwise would necessarily be produced in such bends.

I might also obtain an analogous result by flattening said bends in a suitable direction, that is to say in a direction such that, account being taken of the kinetic energy of the gases, which tends to apply said gases against certain parts of the walls of the bend, it is possible to avoid the production of eddies on other parts of said bend. In this case, I may either still provide guiding surfaces or blades such as above described or, on the contrary, dispense with them.

Of course, the general shape of the exhaust pipes shown by the drawing is given merely by way of indication. In the embodiment shown, it has been supposed that the exhaust pipes 11 open all into a main casing 12 which leads to the turbine intake 3 but it is clear that these pipes might be divided into a plurality of groups separately connected each to a turbine intake.

The intake manifold 13 may be made of any suitable construction. In the example illustrated by the drawing, this manifold is divided into three branches 14, each of which feeds air to two adjacent cylinders.

Whatever be the embodiment of the invention that is chosen, the power plant above described works in a manner which results sufficiently clearly from the above explanations for making it unnecessary to enter into further explanations.

Among the advantages of this system, I may indicate that experience has shown a considerable improvement of the speed of the engine with respect to what is obtained with the usual system.

This improvement averages from 10 to 20% and even more, in velocity.

This involves of course a corresponding improvement of the efficiency of the engine.

It should be noted that the means for avoiding the production of eddies in the exhaust pipes of engines were already known in themselves, but the invention relates especially to the combination of exhaust means of this kind with a turbine, such a combination giving the practical advantages above indicated.

In a general manner, while I have, in the above description, disclosed what I deem to be practical and efficient embodiments of my invention, it should be well understood that I do not wish to be limited thereto, as there might be changes made in arrangement, disposition and shape of the parts, without departing from the principle of my invention, as comprehended within the scope of the appended claims.

What I claim is:

1. A power plant comprising, an internal combustion engine having an intake and an exhaust, at least one compressor associated with said engine, at least one turbine coupled with said compressor for driving said compressor, conduit means connecting said intake and said compressor, conduit means connecting said exhaust and said turbine, whereby said turbine is driven by exhaust gases from said engine, said last named conduit means having bends therein, and vanes disposed in said bends for guiding the streams of the exhaust gases smoothly and without eddies.

2. A power plant comprising an internal combustion engine having intake means, a plurality of cylinders and exhaust means connected with said cylinders, at least one compressor associated with said engine, conduit means connecting said compressor and said intake means, at least one turbine coupled with said compressor, said exhaust means including a main conduit leading to said turbine and a plurality of conduits leading respectively from said cylinders into said main conduit, said plurality of conduits having bends therein, and vanes disposed in said bends for guiding the streams of exhaust gases smoothly and without eddies.

3. In a power plant comprising an internal combustion engine, a compressor for feeding said engine, and a turbine coupled with said compressor and driven by exhaust gases conveyed from said engine to said turbine by conduit means having bends therein; that improvement which resides in vane means disposed in said bends for guiding the streams of exhaust gases smoothly and without eddies.

LOUIS BIRKIGT.